Oct. 25, 1960 V. E. CARBONARA 2,957,742
AUTOMATIC COURSE FOLLOWER AND RECORDER
Filed Dec. 19, 1950 11 Sheets-Sheet 1

INVENTOR.
Victor E. Carbonara.
BY
ATTORNEY.

Oct. 25, 1960

V. E. CARBONARA 2,957,742

AUTOMATIC COURSE FOLLOWER AND RECORDER

Filed Dec. 19, 1950

INVENTOR.
Victor E. Carbonara.
BY
ATTORNEY

V. E. CARBONARA 2,957,742

AUTOMATIC COURSE FOLLOWER AND RECORDER

Filed Dec. 19, 1950

INVENTOR.
Victor E. Carbonara.
BY
ATTORNEY

Oct. 25, 1960 V. E. CARBONARA 2,957,742
AUTOMATIC COURSE FOLLOWER AND RECORDER
Filed Dec. 19, 1950 11 Sheets-Sheet 10

INVENTOR.
Victor E. Carbonara.
BY
ATTORNEY.

Oct. 25, 1960     V. E. CARBONARA     2,957,742
AUTOMATIC COURSE FOLLOWER AND RECORDER
Filed Dec. 19, 1950     11 Sheets-Sheet 11

INVENTOR.
Victor E. Carbonara
BY
ATTORNEY.

United States Patent Office 2,957,742
Patented Oct. 25, 1960

2,957,742
AUTOMATIC COURSE FOLLOWER AND RECORDER

Victor E. Carbonara, Manhasset, N.Y., assignor to Kollsman Instrument Corporation, Elmhurst, N.Y., a corporation of New York Filed Dec. 19, 1950, Ser. No. 201,582

5 Claims. (Cl. 346—8)

This invention relates to navigation instruments and to an automatic course recorder and/or follower for use with vehicles; more particularly to a device for either plotting and recording the movements of the vehicle in longitude and latitude or for maneuvering a vehicle in accordance with a predetermined plotted course.

An object of the present invention is the provision of a device to serve as a link between an automatic celestial navigator and an automatic vehicle control device such as an auto-pilot which operates to supply a signal in accordance with deviations between the actual position as derived from the celestial navigator and the desired position as derived from a preselected course to be used to control the auto-pilot.

Another object of the present invention is to provide a device for positioning a signal producing means or a recording means in relation to a map or chart in accordance with a determination of longitude and latitude as derived from the azimuth and elevation bearings of certain celestial points of reference.

A further object of the present invention, in accordance with the preceding object, is the provision within the device of an arrangement for temporarily simulating actual changes in the bearings of the celestial points of reference when in reality the reference points are temporarily obscured from view.

A still further object of the present invention is the provision of a means for comparing the actual location as derived from a celestial fix with a desired location and for deriving a signal in accordance with any deviation therebetween.

A further object of the present invention, in accordance with the preceding objects, is to provide a means for continuously adjusting the rate of change of the simulated bearings to extrapolate from preceding rates of change the anticipated rate of change in the future.

A more specific object of the present invention is the provision of a device for positioning a photosensitive device and a source of light in relation to a predetermined course defined by the periphery of a non-reflecting surface in accordance with the azimuth and elevation bearings of certain celestial points of reference such that the photosensitive device may develop a signal determined by deviation between the actual position and the predetermined position to be used to correct the actual position to comply with the predetermined position.

Further objects and features of the invention will be readily apparent to those skilled in the art from the specification and appended drawings illustrating certain preferred embodiments in which:

Figure 19 is an elevational view of the automatic star follower and level providing the signals controlling the course recorder and/or follower.

Figure 1:
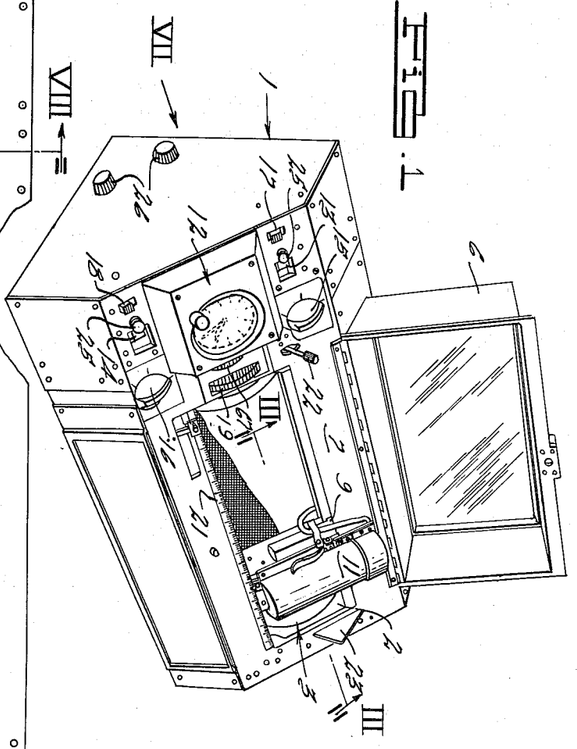
Figure 1 is a perspective view of the course recorder and/or follower showing a cover opened to reveal the carraige having a photosensitive device mounted thereon and the drum holding the chart.

The course recorder and/or monitor of the present invention comprises certain means and mechanisms whose prime objective is the controlling of the rotation of a drum carrying a chart and the positioning of a carriage, having either a recording stylus or a photosensitive device thereon, with relation to the chart or drum. The drum 3 and chart 8 are enclosed within an outer casing 1 shown in Figure 1 as including an inclined front plate 7 having a generally central opening 2 through which the chart 8 is accessible. Over the chart 8 is mounted a reciprocable carriage 9 carrying a photosensitive device 11 to be more fully described hereinafter, and a hinged cover 6 having a front window is provided over the carriage 9 and opening 2. To the left of the opening 2 to the drum 3 is a clock 12 operating on sidereal time, a pair of windows 13 and 14 through which indications of longitude and latitude may be viewed, a pair of selector knobs 15 and 16 for selecting the desired rates of travel for the drum 3 and carriage 9, respectively, a pair of electrical control switches 17 and 18, and a pair of indicator scales 19 and 21 for initial adjustment of the drum and carriage. A switch is provided at 22 for controlling the conditions of "recording" and "not recording" and this determines the position of an indicator 23 at the opposite end of the device. Lamps are provided at 25 for illuminating the dials of the counters indicating latitude and longitude viewed through windows 13 and 14 respectively, and a pair of adjuster knobs are provided at 26 for adjusting a rate motor whose operation will be more fully described hereinafter.

Figures 3, 4, 5:
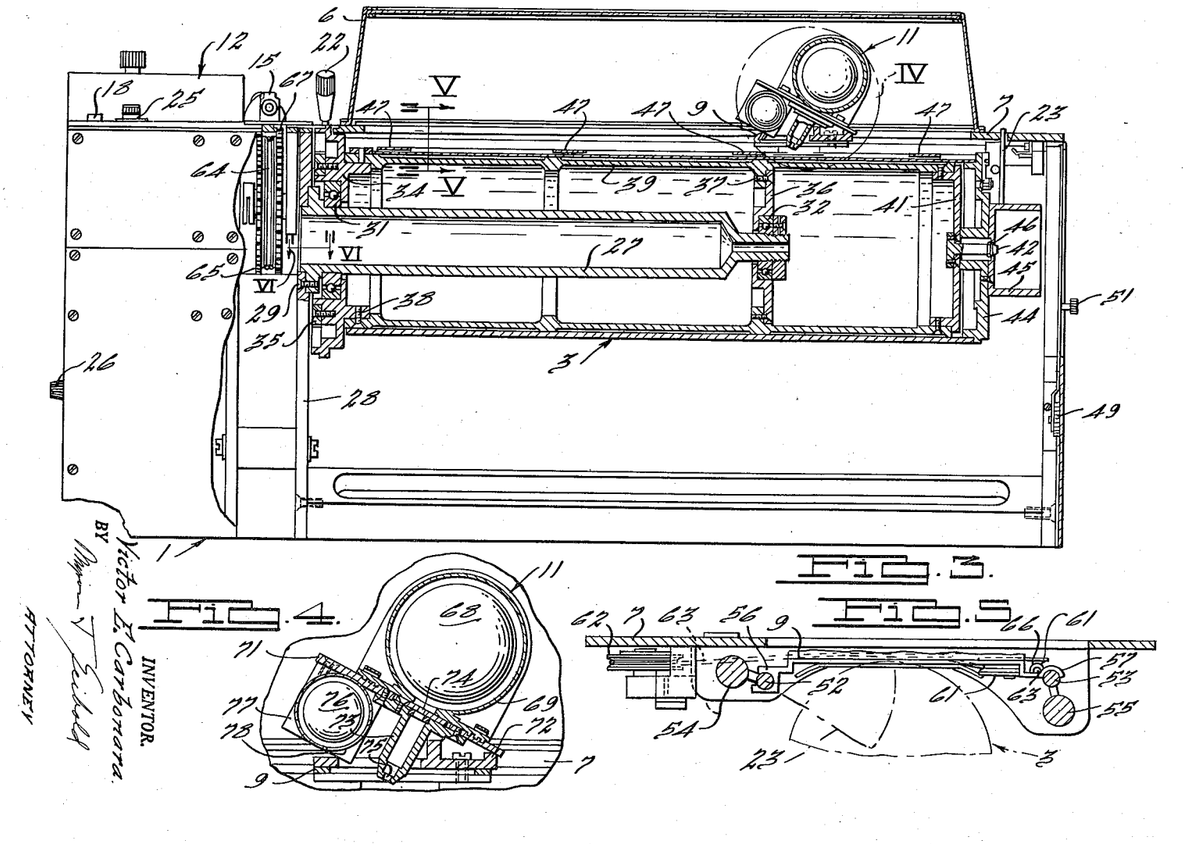
Figure 3 is a partial sectional view on line III—III of Figure 1 in a direction inclined 45° to the vertical and showing the drum, its supporting spindle, and the carriage and phototube in section.
Figure 4 is an enlarged view of the encircled portion IV of Figure 3 showing the phototube and carriage in section.
Figure 5 is a vertical sectional view along the lines V—V of Figure 3 showing the carriage mounting means with phototube cut away.

In Figure 3 is shown a cutaway sectional view of the device showing a stationary central spindle 27 secured to a frame 28 as by screws 29 and having a pair of bearings 31 and 32 secured thereto. An irregularly shaped support 34 is carried on the rotating portion of bearing 31 and has a ring gear 35 mounted thereto for use in driving the support about the bearing. A second support 36 is carried by bearing 32 so as to be rotatable thereabout. Carried by the supports 34 and 36 and secured thereto as by means of screws 37 and 38 is a cylinder 39 which extends beyond the length of the spindle 27 to approximately the end of the window opening in the front plate 7 where it terminates in an end plate 41 having a nipple-like structure 42 secured thereto. A cylindrical drum 3 is shown fitted over and supported on the cylinder 39 and is provided with an end plate 44 which carries a cup-shaped handle 45 having secured thereto by conventional means a resilient member 46 which fits over the nipple 41 to secure the drum 3 on the cylinder 39. At the top of the drum 3 is shown a plurality of resilient strips 47 which are employed to secure a chart on the drum. The peripheral surface of the irregular shaped support 34 is provided with indicia to develop the scale 19 which may be read through the front plate 7. The end wall of the device is provided with a door which is hinged at 49 on the end wall and may be opened by moving knob 51 to provide access to the handle 45 and to permit removal of the drum 3 from the cylinder 39.

Figure 2:
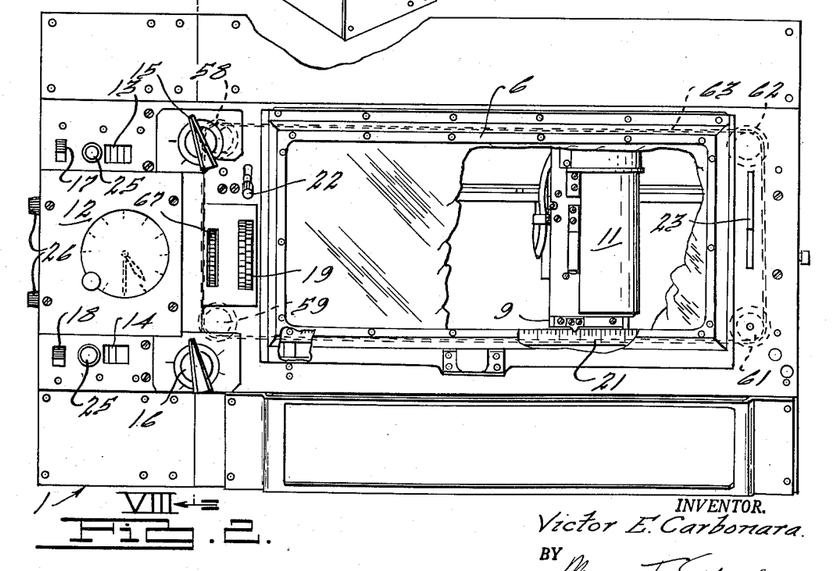
Figure 2 is a front elevational view of the course recorder and/or follower with the cover plate cut away to show the carriage.

Figure 5 shows the mounting of the carriage 9 over the drum 3. The carriage 9 is positioned on shafts 52 and 53 which are carried by larger shafts 54 and 55 and is supported by means of legs 56 and 57 which slidably engage the shafts 52 and 53 respectively. In Figure 2 are shown four pulleys 58, 59, 61 and 62 which define the route of a cable 63 around the device. The cable 63 is wrapped around and rotated by a wheel 64 (shown in Figure 3) which has a geared periphery at 65 which is driven by a mechanism to be more fully described hereinafter. The cable 63 is secured to the carriage 9 by means of a clip 66 on leg 57 and moves the carriage longitudinally back and forth as wheel 64 is rotated. A knurled edge is provided on wheel 64 at 67 which extends through the front plate 7 to provide a means for adjusting the position of the carriage 9 longitudinally along the device.

In Figure 4 is shown a sectional view of the photosensitive device 11 made up of a phototube 68 mounted within a casing 69 secured to a mounting plate 71 mounted at an angle to the carriage 9 by means of a support frame 72. Secured to the plate 71 is a tube 73 having apertures 74 and 75 at either end. An argon or other inert gas filled lamp 76 is supported by the plate 71 and is enclosed in a casing 77 which has an opening at 78 permitting its light to strike a chart on the drum and return to the phototube 68 through the tube 73.

Figure 22:
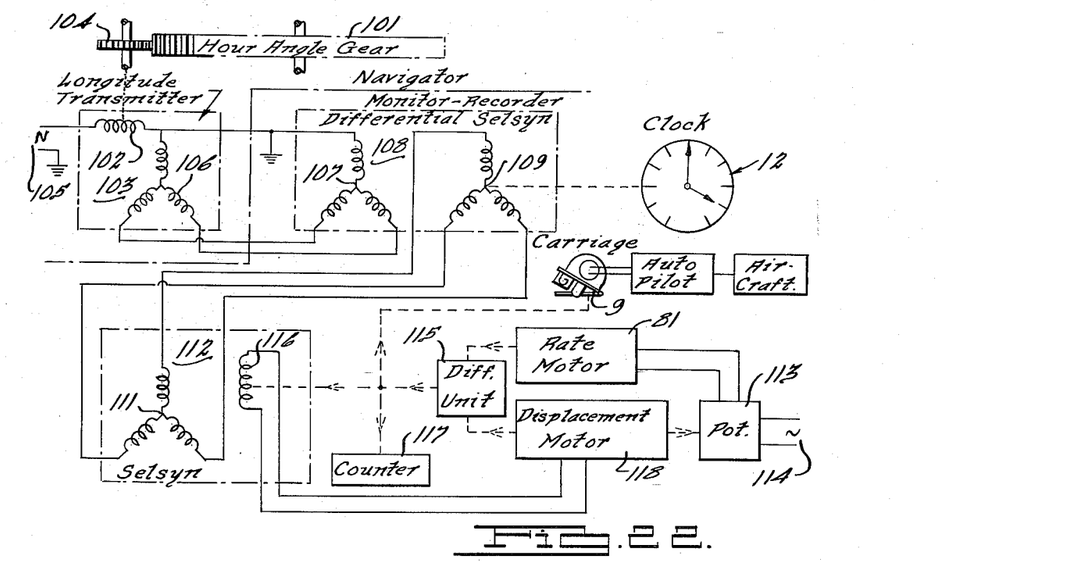
Figures 22 and 23 are block diagrams of the present invention showing the longitude and latitude responsive sections respectively.
Figure 23:
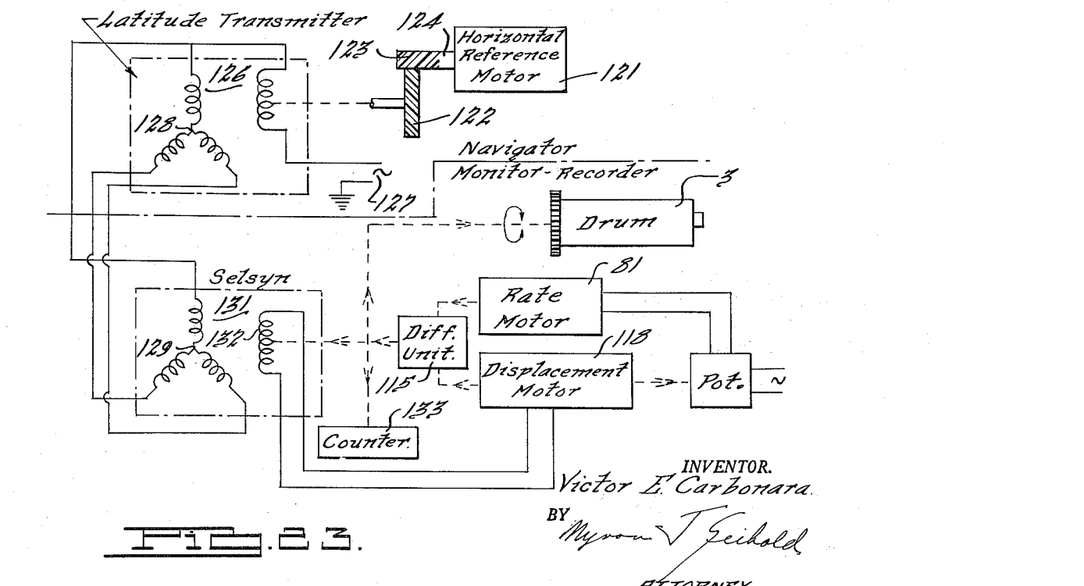

A general outline of the device of the present invention is shown in the block diagrams of Figures 22 and 23. Figure 22 is a block diagram of the longitude responsive circuit of the device in which an hour angle gear plate 101 of an automatic celestial navigator, more particularly described in applicant's copending application entitled Automatic Navigator Serial No. 201,581, filed December 19, 1950 and shown in Figure 19 which is to be described later, is shown positioning the rotor 102 of a longitude transmitter 103 through a follower gear 104. The rotor is energized from a source 105 and induces a signal in the stator windings 106 in accordance with its position. The induced signal is fed to a first winding 107 of a differential rotary transformer 108 which has a second winding 109 positioned by a clock 12 in accordance with sidereal time. The output of the differential rotary transformer 108 is then used to energize the stator 111 of a rotary transformer 112 and thereby energizes the stator in accordance with the exact longitude of the navigator previously mentioned.

A rate motor 81 is provided in the monitor-recorder portion of the invention and is energized through a potentiometer 113 from a source of voltage 114 to drive a differential gear unit 115 in accordance with a preselected or predetermined rate of change of longitude. The output of the differential gear unit 115 positions the rotor winding 116 of the rotary transformer 112, a longitude counter 117 and the carriage 9 in the photosensitive section of the invention. A second motor 118, hereinafter referred to as the displacement motor, is energized by any unbalance existing in the rotary transformer 112 and puts a second drive into the differential gear unit 115 which is compared with that already presented through the rate motor 81 to provide an output which is the differential between or the algebraic sum of the two inputs. The displacement motor 118 also adjusts the potentiometer 113 to adjust the rate of rotation of the rate motor 81 such that it drives the rotor winding 116 of the rotary transformer 112 to retain a balance in the transformer. In this manner the winding, counter and carriage will be moved at a rate extrapolated from a preceding rate if, for any reason, the automatic celestial navigator should momentarily lose contact with its celestial points of reference, as for example, due to an overcast or cloud formation between the automatic celestial navigator and the celestial points of reference.

In Figure 23 is shown a similar arrangement to that shown in Figure 22 for use in the latitude responsive circuit of the invention. The horizontal reference motor 121 of the automatic celestial navigator drives a gear 122 through a pinion 123 on its shaft 124 to position the rotor winding 125 of a rotary transformer 126. The rotor winding 125 is energized from a source 127 and induces a signal in the stator windings 128 in accordance with its position. The signal in the stator windings 128 is fed to the stator windings 129 of a second rotary transformer 131 and thereby energizes the stator 129 in accordance with the exact latitude of the navigator.

A rate motor, displacement motor, potentiometer and differential unit similar to those provided in the longitude circuit of Figure 23 are provided for positioning the rotor winding 132 of the rotary transformer 131, a latitude counter 133 and the drum 3 in the photosensitive section of the invention.

The photosensitive section of the invention comprises a photosensitive device 11 which is moved with relation to a chart 8 in accordance with changes in longitude with the chart 8 being rotated with the drum 3 in accordance with changes in latitude. The chart may have drawn thereon a desired route of travel defined by light reflecting and non-reflecting surfaces upon which radiant energy is directed from the lamp 76 in the photosensitive device 11. The reflected radiant energy is directed to the phototube 68 in quantities dependent upon the relative position of the lamp 76 and the desired course plotted on the chart 8. The signal developed by the phototube then may be used to position the control surfaces of a vehicle to bring the vehicle into the position desired as prescribed on the chart 8.

Figure 8:
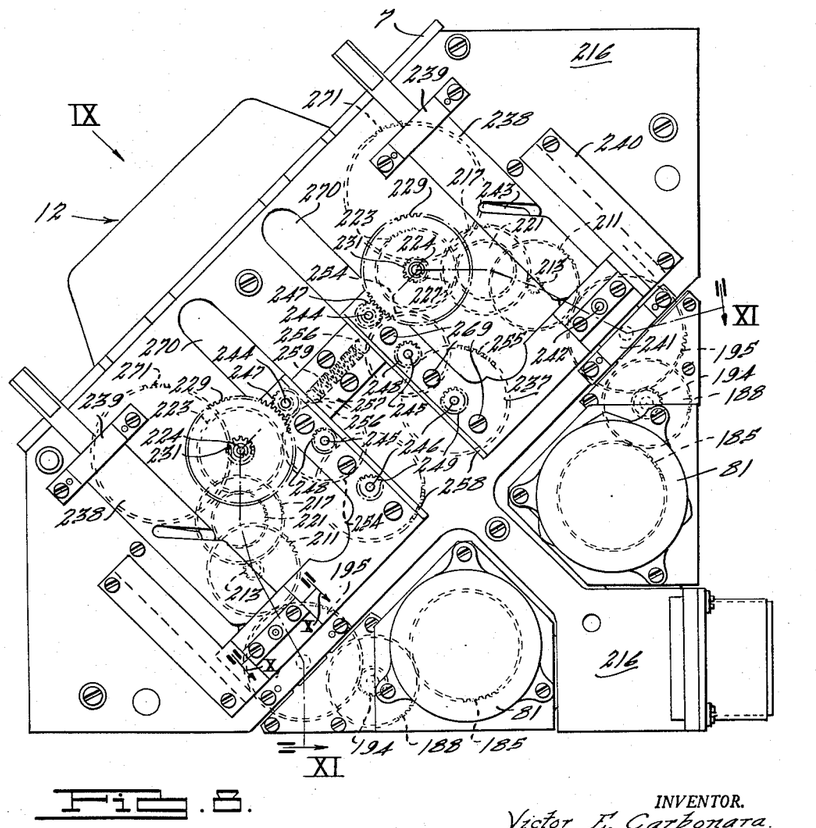
Figure 8 is a view of the operating mechanism taken from the side opposite to Figure 7 and generally along line VIII—VIII of Figure 2.
Figures 9, 10:
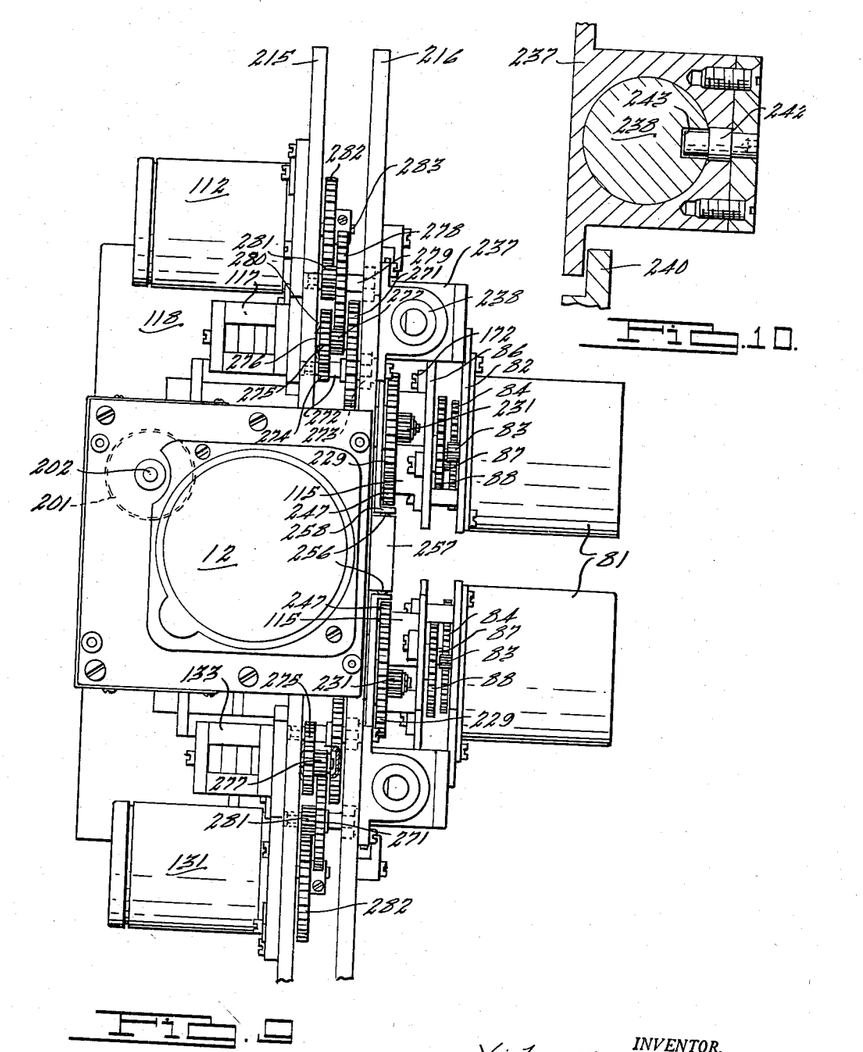
Figure 9 is a view of the operating mechanism of the device taken in the direction of arrow IX in Figure 8.
Figure 10 is an enlarged detail sectional view taken along the line X—X of Figure 8.
Figure 10:
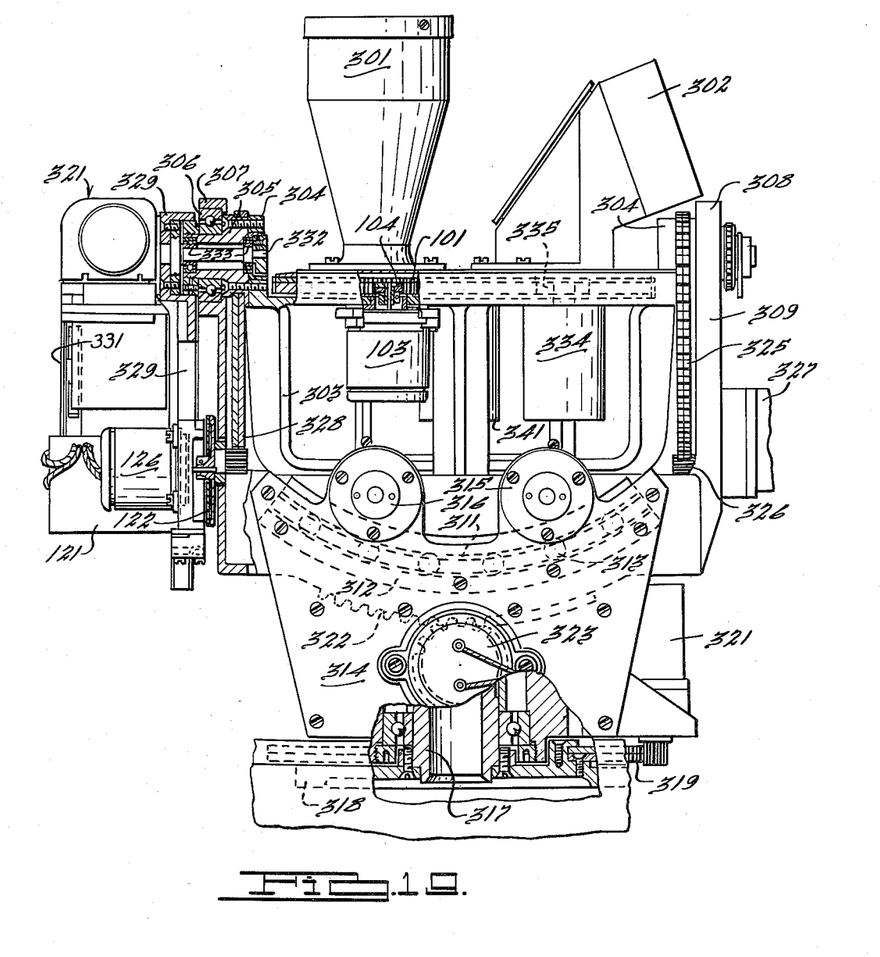
Figure 12:
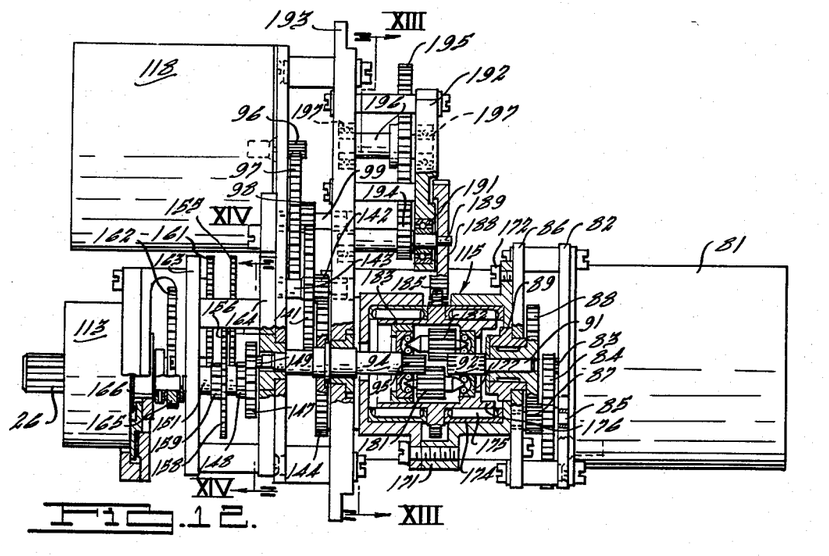
Figure 12 is an elevational view of drive and differential units showing certain parts in section.

In Figures 7, 8, 9 and 12 the various operating mechanisms of the device which produce the desired motion between the drum 3 and the carriage 9 are shown. Only one side of the mechanism will be explained for it will be readily apparent that the other side constitutes an exact duplicate of the first with but minor changes at the input or output. In Figures 8, 9 and 12 is shown the rate motor 81 which is mounted on a support frame 82. A pinion gear 83 on the shaft of motor 81 is meshed with a gear 84 which is carried by a shaft 85 journaled in spaced frames 82 and 86. A pinion gear 87 on the shaft 85 is meshed with a gear 88 which is journaled in frame 86 by means of a bearing 89. Gear 88 is fitted on a shaft 91 which carries a pinion 92 at its opposite end which is meshed with gears in the differential unit 115 which will be more fully described hereinafter.

Figures 13, 14:
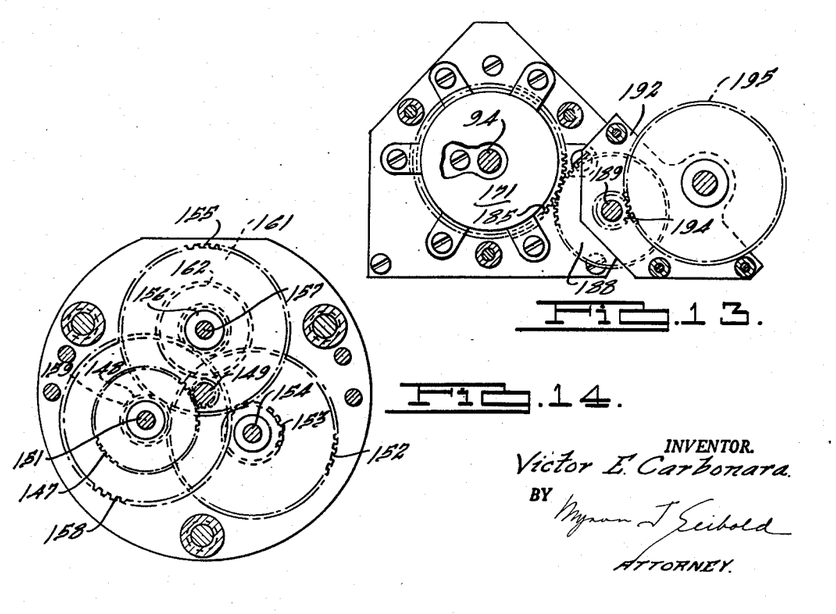
Figure 13 is a detail sectional view taken along the line XIII—XIII of Figure 12 and rotated through 90° in the plane of the view.
Figure 14 is a sectional view taken along the line XIV—XIV of Figure 12.
Figure 15:
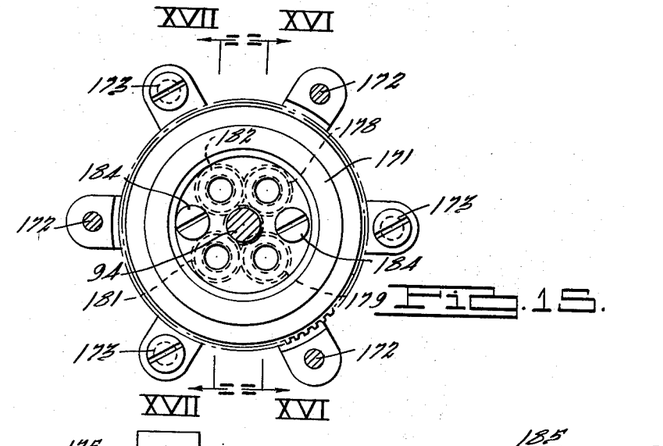
Figure 15 is an end view of the differential unit of the present invention.
Figure 16:
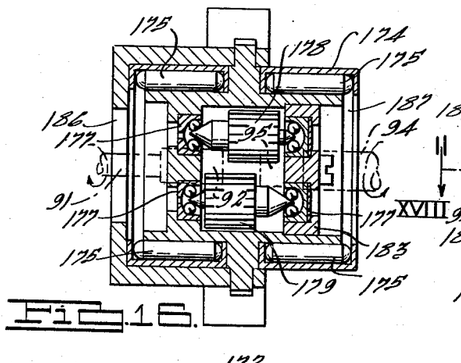
Figure 16 is a longitudinal sectional view of the differential unit taken along the line XVI—XVI of Figure 15.
Figure 17:
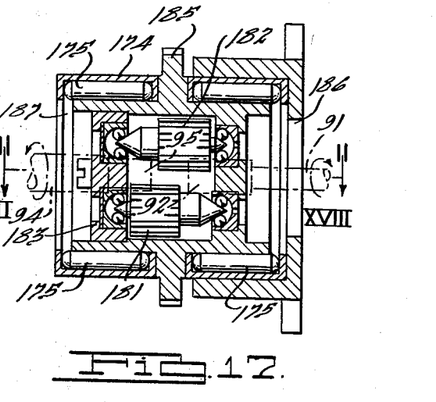
Figure 17 is a longitudinal sectional view of the differential unit taken along the line XVII—XVII of Figure 15.
Figure 18:
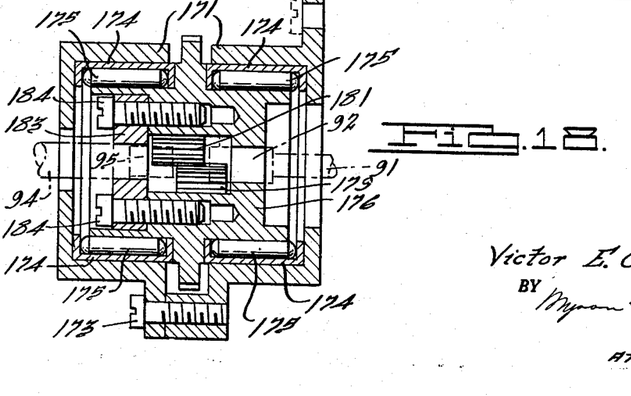
Figure 18 is a longitudinal sectional view of the differential unit taken along the line XVIII—XVIII of Figure 17.

A second motor 118, the displacement motor, is mounted to a frame 93 by suitable means and drives a second input shaft 94 and pinion 95 in the differential unit 115 through gear reduction means comprising a pinion gear 96 on the shaft of motor 118, a gear 97 and pinion 98 on shaft 99, a gear 141 and pinion 142 on shaft 143 and gear 144 on the shaft 94. Shaft 94 has a pinion 145 at its opposite end which drives a gear reduction unit 146 to position the adjustable member of a potentiometer 113. The gear reduction unit 146, shown more particularly in Figure 14, is made up of gear 147 carrying gear 148 therewith and meshing with a pinion 149 on the shaft 94 and is rotatable about shaft 151. Gear 148 meshes with gear 152 carrying gear 153 therewith and is rotatable about shaft 154. Gear 153 is meshed with gear 155 which carries gear 156 therewith on shaft 157. Gear 156 is meshed with gear 158 which carries gear 159 therewith and rotates about shaft 157 independently of the combination of gears 147 and 148; gear 159 and gear 148 are the same size and show as one in Figure 14. Gear 159 is meshed with gear 161, shown in the same outline as gear 155 in Figure 14, which rotates shaft 157 independently of gears 155 and 156 and has a pinion gear 162 thereon outside of the frame 163 which supports the shafts 151, 154 and 157 with frame 164. Pinion 162 drives gear 165 and the adjustable member of the potentiometer 113 therewith through a clutch 166. A knob 26 is provided for producing an intial adjustment of the potentiometer 113.

The differential unit 115 which has inputs from the rate motor 81 and the displacement motor 118 through their respective gear reduction units is shown more particularly in Figures 15, 16, 17 and 18 as made up of a two part stationary outer casing 171 secured together by screws 172 and attached to frame 86 by suitable means such as by screws 173. Within the outer casing 171 are stationary bearing races 174 which carry needle bearings 175 held therein by an inner race 176 which provides inner supporting surfaces for ball bearing races 177. The ball bearing races 177 provide practically frictionless supporting journals for spindle gears 178, 179, 181 and 182 with an end plate 183 holding the spindles and ball bearing races in place by being secured to the inner race 176 by means of screws 184. The inner race 176 is rotatable about the stationary bearing races 174 because of the needle bearing engagement between the two structures and has gear teeth cut in an outwardly extending flange 185 to develop a gear thereon. Shafts 91 and 94 are inserted into the differential unit through cutout portions in the casing 171 and mesh with the spindle gears such that pinion 92 is meshed with spindles 182 and 179 and pinion 95 is meshed with pinions 178 and 181. Spindles 178 and 182 are meshed with each other as are spindles 179 and 181.

The differential unit 115 operates to combine the rotation of the rate motor 81 and the displacement motor 118 such that when one pinion is stationary and the other rotating, the outer gear on flange 185 rotates in the same direction at a proportionate speed. If both pinions are rotating in the same direction and at the same speed, the outer gear 185 will rotate in that direction but at a speed which is twice the original proportionate speed, and if the pinions are rotating in opposite directions but at the same speed, the outer gear 185 will not rotate. Combinations of directions and speeds of rotation will develop a continuously variable speed and direction of rotation of the outer gear 185.

Gear 185 is meshed with gear 188 fixed to shaft 189 which rotates in bearings 191 in frames 192 and 193. A pinion gear 194 on shaft 189 is meshed with gear 195 on shaft 196 which rotates in bearings 197 in frames 192 and 193.

Figures 6, 7:
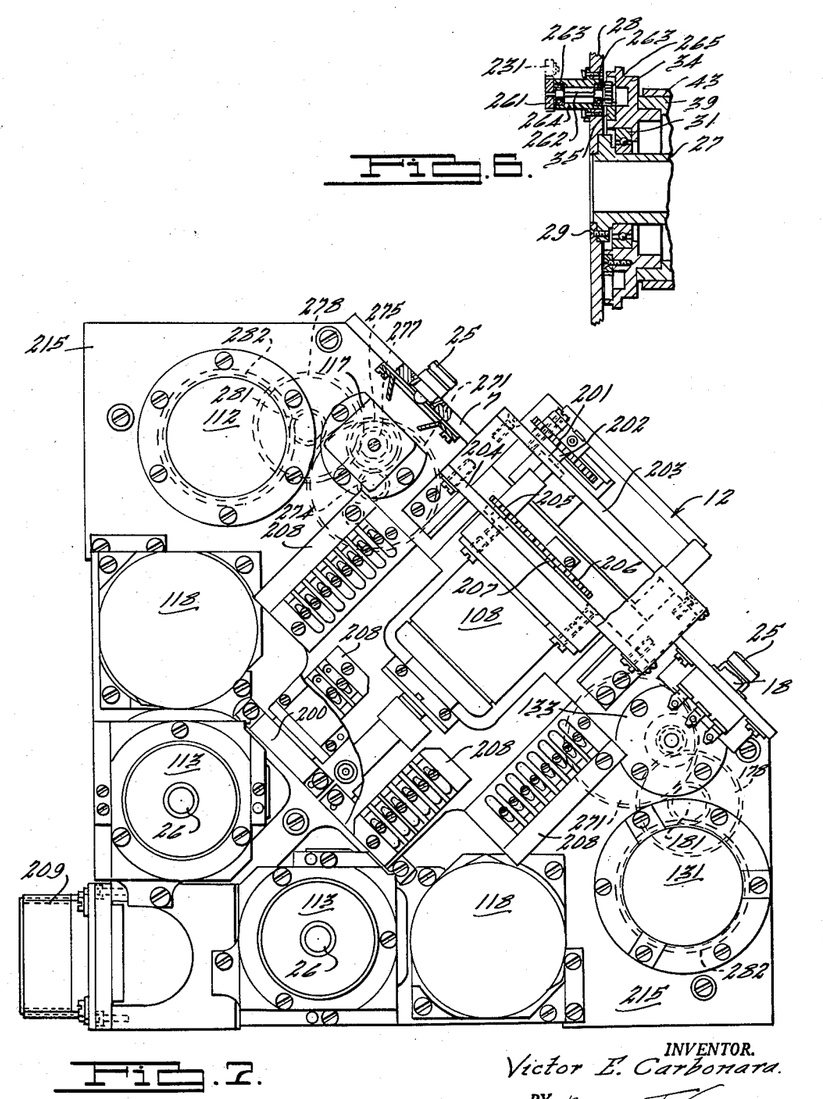
Figure 6 is a detail sectional view along the lines VI—VI of Figure 3 showing the drum support and drive.
Figure 7 is an end elevational view of the operating mechanism taken with the end cover plate of the device removed.
Figure 11:
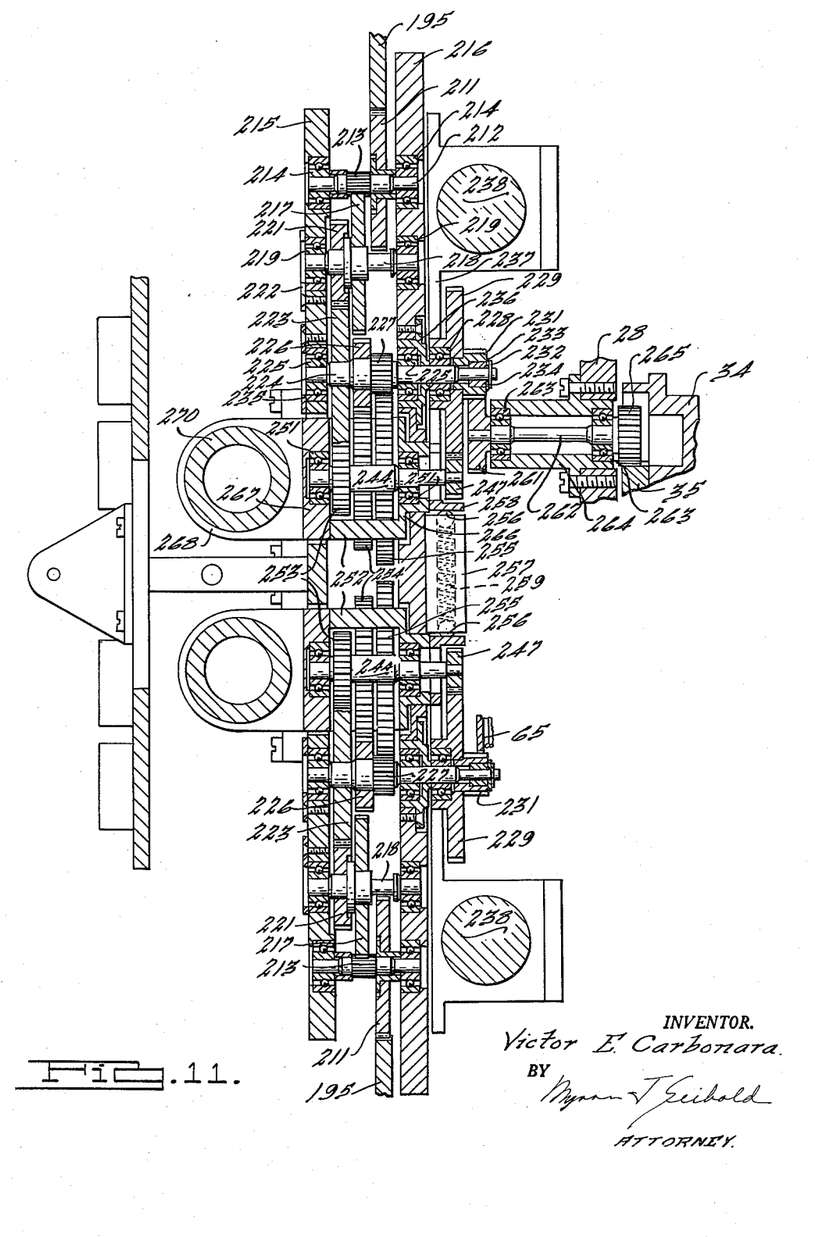
Figure 11 is a sectional view taken along the multiplanar line XI—XI of Figure 8 with certain of the elements revolved into the plane of view.

Figures 7 and 8 show the operating mechanism of the present invention from either side, showing in Figure 7 the clock 12 whose operating mechanism drives a gear 201 on shaft 202 supported on plates 203 and 204 secured by means not shown to the front plate 7 and having a pinion gear 205 thereon which drives a gear 206 on the shaft 207 of a differential rotary transformer 108 mounted on plate 204. The differential rotary transformer 108, as has been previously described, develops an excitation for the rotary transformer 112 which in turn energizes the displacement motor 118 in the longitude section of the device. Terminal blocks are shown at 208 for interconnecting the various electrical connections and an input plug is shown at 209 through which power and outside signals may be carried. Figures 8 and 11 show the opposite side of the operating mechanism and shows the gear drive from the differential unit output gear 195 through the operating drive of the device. The gear 195 is shown meshed with a gear 211 secured to shaft 212 and rotating a pinion 213 therewith. Shaft 212 is journaled in bearings 214 in mounting plates 215 and 216. Pinion 213 drives gear 217 which is mounted to shaft 218 journaled in bearings 219 in mounting plates 215 and 216 and rotates a second gear 221 through rotating shaft 218. A face plate 222, secured to plate 215 as shown, holds the bearings 219 and the shaft 218 therewith in the mounting plates 215 and 216. Gear 221 drives a gear 223 which rotates shaft 224 in its bearings 225 and thereby rotates gear 226 and pinion 227. Shaft 224 extends through the mounting plate 216 to carry a bearing 228 upon which a gear 229 is mounted. Gear 229 has a smaller gear 231 secured thereto which rotates about the shaft 224 with the gear 229. Snap clip 232, washer 233 and bearing 234 are provided at the end of shaft 224 for holding gear 229 in place and for permitting rotation of the gear about the shaft. A face plate 235 is provided to secure bearing 225 in plate 215 and likewise a face plate 236 is provided for securing the other bearing 225 in place in frame 216.

A movable frame 237 is provided for permitting a change in the ratio of transmission from the drive units to the driven members, the drum and the carriage. Movement of the frame 237 is accomplished by rotation of shaft 238 by knob 15 in its bearings 239 and 241. Rotation of the shaft 238 causes movement of the frame 237 along guide 240 through movement of a pin 242 in the spiral groove 243 (see Figure 10) cut in the shaft 238 and thereby causes in and out movement of the frame 237. Frame 237 carries three shafts 244, 245 and 246 having gears 247, 248 and 249 mounted thereon, all three gears being the same size. Shafts 244, 245 and 246 are journaled in bearings 251 within a box-like frame constructed of a front plate 266 having a spacing leg at 252 and a rear plate 267 suitably secured to each other. The rear plate 267 has extending supports 268 (only one of which is shown) which acts as a guide for the movement of the frames. The boxlike frame is secured to the frame 237 by screws 269 as is shown in Figure 8 and is movable therewith. The extension supports 268 move up and down on the cylindrical shaft 270 as the frame 237 moves up and down with rotation of shaft 238. Shaft 270 is secured to the base of the device as shown in the cutout portion of Figure 7 at 200.

Between the front and rear plates 266 and 267 on shafts 244, 245 and 246 respectively are mounted gears 253, 254 and 255 which are of the proper size to mesh respectively with gears 223, 226 and 227 mounted on shaft 224. With the frame 238 in the position as shown in Figures 8 and 11, gear 223 is meshed with gear 253 and gear 247 is meshed with gear 229 to thereby drive gear 231. As the knob 15 is rotated, the frame 238 is moved and in its next engaged position gear 226 will be meshed with gear 254 and gear 248 will engage gear 229 and will drive gear 231 at a different speed from that developed in the original setting. A third ratio of drive is developed when knob 15 is rotated to its third position in which pinion 227 engages gear 255 on shaft 246 and gear 249 engages gear 229 to a drive gear 231. A spring 259 biasing a pair of balls 256 is provided in a stationary frame 257 to insure positive engagement of the gears in the various settings and indentations may be provided in flange 258 on frame 238 into which the balls 256 will move to provide setting positions for the frame 238.

As has been previously stated, the gearing arrangements just explained in the upper portion of Figure 11 are duplicated in the lower portion and the drives are identical up to the gear 231. The upper portion which drives the drum about central spindle 27 has an additional extension gear drive connected thereto. The gear drive is made up of a gear 261 on shaft 262 which is journaled in bearings 263 secured in extension tube 264 which is secured by suitable means to frame 28, upon which the central spindle 27 is mounted, and drives gear 265 on the opposite side of frame 28 to drive through its meshed engagement with ring gear 35 the support 34 about spindle 27 as is shown in Figure 6. Gear 231 of the lower portion of Figure 11 engages the geared periphery 65 of the wheel 64 to rotate the wheel and move the cable 63 to position the cradle 9 with respect to the drum 3.

Figure 9 shows the operating mechanism of the invention with the cover plates removed. The connecting drive from the drum and carriage drives to their respective counters and rotary transformers is shown in Figure 9 and is made up of a gear 271 which is meshed with gear 227 in the drum and carriage drive and is mounted on shaft 272 and journaled in bearings 273 between spaced frames 215 and 216. Shaft 272 carries a pinion gear 274 thereon which is meshed with gear 275 on the drive shaft 276 of either the longitude counter 133 or the latitude counter 117. The counter is secured by suitable means to the frame 215 as shown in Figures 7 and 9. The shaft 276 of the counters 117 and 133 extends through the gear 275, carries a pinion gear 277, and terminates in a cutout portion in gear 271. Pinion gear 277 is fixed to shaft 276 whereas gear 275 is loose thereon. A resilient leaf spring 280 provided between a shoulder on the shaft 276 (not shown) presses gear 275 against pinion gear 277 and provides a friction clutch type engagement between the two gears. The pinion gear 277 engages a gear 278 mounted on shaft 279 which is journaled between the frames 215 and 216 which carries a pinion gear 281 engaging gear 282 secured to the shaft 283 of the rotary transformer 112 or 131 in the latitude or longitude sections respectively. The rotary transformer is mounted to the frame 215 by suitable means as shown in Figures 7 and 9.

In Figure 19 is shown the automatic celestial navigator which is used in conjunction with and as part of the present invention. The automatic celestial navigator is more fully described in applicant's copending application above identified. The automatic navigator has mounted on the top of an hour angle gear plate 101 two seeking telescopes: telescope 301 which is oriented to seek Polaris and telescope 302 which seeks a second star of strength comparable to Polaris such as Capella. Any desired number of telescopes greater than one seeking any of the stars of sufficient magnitude for instrument responses may be utilized in the navigator. The line of sight of each telescope is mechanically related to the supporting plate, the other telescope and the particular star it is to seek in the operation of the instrument. The hour angle gear 101 is mounted in a frame 303 which provides support for the associated light sensitive mechanism later to be described and has a pair of supporting hubs 304 rigidly secured to a pair of hollow rotatable shafts 305.

Shafts 305 are rotatably mounted in bearings 306 on trunnions 307 and 308 in the opposite sides of a cradle 309. The cradle 309 is mounted for rotation about an axis at right angles to the axis of rotation of the shafts 305 by means of a pair of races 311 at opposite sides of the cradle other than the sides on which the trunnions 307 and 308 are located, the races 311 cooperating with and being supported by a pair of stationary races 312 through a plurality of spaced ball bearings 313. The races 312 are mounted in a lower outer cradle 314. On the cradle 314 above the races 312 are mounted a pair of retainer wheels 315 upon stationary shafts 316. The outer cradle 314 is rotatably mounted through bearings upon a central stationary shaft 317 secured in the instrument mounting plate 318. A stationary gear ring 319 is rigidly secured to the mounting plate 318 and has gear teeth at its periphery meshing with teeth of a pinion gear driven by a motor 321, the pinion and motor being supported upon the outer cradle 314 so that rotation of the motor is accompanied by rotation of the cradle 314 and the parts mounted thereon in azimuth about the central shaft 317. An azimuth scale and reference, one suitably mounted on the cradle 314 and the other fixed with respect to the mounting plate 318, provide for a setting or reading of the azimuth of the instrument.

Mounted on the cradle 309 parallel to the races 311 and 312 is a geared sector 322. A motor 323 is mounted in the outer cradle 314 and drives a pinion 324 which meshes with the teeth on the gear sector 322 to effect rotation of the cradle 309 about an axis of rotation passing through the centers of development of the races 311 and 312.

Rigidly mounted upon the shaft 305 at the right of the instrument, as viewed in Figure 19, is a geared sector 325 which meshes with a geared pinion 326 driven by the motor 327 mounted upon the cradle 309. Rotation of the motor 327 is accompanied by rotation of the frame 303 and elements mounted therein about the axis of rotation of the shafts 305. Rigidly mounted upon the shaft 305 at the left of Figure 19 is a gear sector 328 which meshes with a pinion 123 driven by a motor 121 mounted upon a frame 329 which carries the horizontal reference 331 to be hereinafter described, the pinion on motor 121 passing freely through an opening in the side of the cradle 309 adjacent thereto. Movement of the frame 329 will be determined by the differential rotation between the sector 325 and the pinion driven by the motor 121.

The horizontal reference frame 329 is mounted on a shaft 332 which is journaled in bearings 33 in the trunnion 307 of cradle 309 and is freely movable to develop an indication of the local horizontal. A rotary transformer is mounted to frame 329 and has a pinion 122 on its shaft which engages the pinion 123 on the shaft of the motor 121 to be rotated therewith to develop a signal in accordance with the position of the horizontal reference frame 329.

A motor 334 is mounted to the frame 303 by suitable means not shown and has a pinion 335 on its shaft which engages the geared hour angle plate 101 to position it about its center. A rotary transformer 103 having a pinion 104 on its shaft which engages the geared hour angle plate 101 and is positioned therewith.

Figure 20:
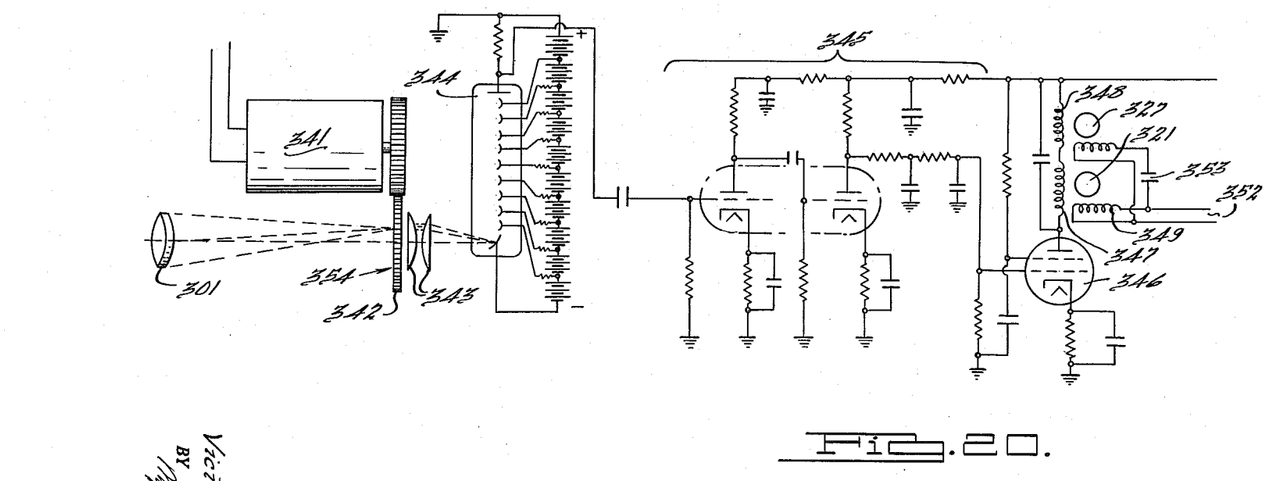
Figure 20 is a schematic representation of the light sensitive scanning system controlling the operating motors of the star follower and level of Figure 19.

In Figure 20 is shown the amplifier circuit and the phototube as employed in the automatic navigator shown in Fig. 19 to produce the input for the amplifier circuits which energize the restoring motors, such as 321 and 327, mounted in quadrature. For the sake of example, the component parts of amplifier circuit will be explained as associated with the Polaris telescope 301; however, it will be readily understood that similar amplifier circuits are associated with both the horizontal reference light sensitive circuit and the Capella telescope.

Figure 21:
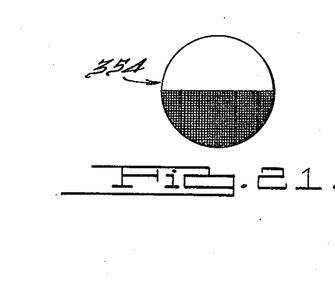
Figure 21 is a view of a shutter disc used in the scanning system of Figure 20.

In the representative system of Figure 20, there is shown the telescope system 301, the shutter drive motor 341 driving the shutter holder 342 holding shutter 354, the lens system 343 and the phototube 344. A suitable amplifier circuit 345 containing the necesary filtering circuits and electronic amplifier tubes is provided with a final amplifying stage 346 driving a resonant circuit containing one field winding, 347 and 348, of each of the controlled motors 321 and 327. The motors 321 and 327 have their other windings 349 and 351 energized from a supply voltage 352, one being energized directly from the supply and the other energized by the supply voltage shifted approximately 90 electrical degrees by the effect of capacitor 353 connected in series therewith. The operation of this circuit is more fully described in a copending application of Howard J. Eckweiler, entitled "Scanning System," Serial No. 95,768, filed May 27, 1949, now Pat. No. 2,713,134. Shown in Figure 21 is one form of shutter used in the present invention which consists of a disc of transparent material blacked out across one half of its surface so as to present a semi-circle of transparent material and a semi-circle of opaque material to interrupt the light beam so as to produce a time-phase signal from the phototube which is an indication of the orientation of the telescope with relation to its associated star.

In the operation of the course recorder and follower of the present invention, the automatic navigator, as shown ion Figure 19, is first employed to develop signals of longitude and latitude in accordance with the alignment of the two telescopes 301 and 302. Telescope 301 employing the amplifier circuit as shown in Figure 20 develops a time-phase determined signal for energizing a pair of motors 327 and 321, which align the navigator to direct the telescope 301 to Polaris. At the same time, telescope 302 employing a similar amplifier circuit develops a signal which is employed to energize motor 323 to align telescope 302 with Capella. When the two telescopes are aligned with their respective stars, the hour angle plate 101 is aligned with the celestial equator and shafts 305 are aligned in an east-west direction. The horizontal reference 331 employing a light source, a liquid pool and photosensitive tube as is disclosed in Patent No. 2,557,340 issued June 19, 1951, entitled "Horizontal Reference," develops a pair of signals from an amplier circuit as shown in Figure 20 which are employed to energize motors 121 and 334. Motor 121 moves the horizontal reference about its mounting pivot on shaft 332 to align the horizontal reference in one plane, and motor 334 causes movement of the hour angle plate 101 which causes misalignment of telescope 302 which energizes motor 323 to rotate cradle 309 to balance the horizontal reference in a second plane perpendicular to the first balancing plane. The horizontal reference now gives a signal indicative of the local vertical and thereby gives an indication of latitude. The position of the hour angle gear 101 as maintained in its fixed position through alignment with the two celestial points of reference is such that when it is combined with an indication of sidereal time it may be used to indicate longitude. Rotary transformers 103 and 126 are provided for picking off the position of the hour angle gear plate 101 and the horizontal reference 331 respectively for transmission to the automatic course recorder and follower for positioning the carriage 9 and the drum 3 respectively.

In the latitude section of the device, as shown in Figure 23 employing the mechanisms shown in Figures 9 and 12, the signal from the latitude rotary transformer 126 is fed to rotary transformer 131 in the course recorder and follower and any unbalance developed therein is fed to the displacement motor 118 to cause it to rotate to drive one input to the differential unit 115 through the gear reduction means shown in Figure 12. The rate motor 81, as has been previously described, is energized through potentiometer 113 from voltage source 114 to put a second drive into the differential unit 115 through the associated gear reduction means as shown in Figure 12 and this is combined with the drive from the displacement motor 118 to develop an output from the differential unit. The output of the differential unit is transmitted through the gear reduction means shown in Figure 12 and Figure 11 and is transmitted through the selected gear ratio as determined by the setting of knob 15 to the output gear 231. From this point the drive is transposed through the extenison gear drive comprising input gear 261 and output gear 265 as shown in Figure 11 to the ring gear 35 on the drum support 34 to develop rotation of the drum 3 in accordance with changing latitude.

The longitude section of the device is similar to that employed in the latitude section, however, the output from the rotary transformer 103 must be combined with an indication of sidereal time before being fed to the rotary transformer 112 in order that the energization of the stator winding 111 of the rotary transformer 112 will be indicative of longitude. The energization through the displacement motor 118 and the rate motor 81 into the differential unit 115 and on through the gear reduction means as shown in Figures 11 and 12 is the same as has been described with relation to the latitude section up to gear 231 where the output of the longitude section is transmitted to gear 65 on the periphery of wheel 64, which carries the cable 63 employed to slide the carriage 9 along rods 52 and 53. The carriage is therefore positioned in accordance with longitude and the drum is rotated in accordance with latitude as derived from the automatic navigator employed with the device.

If it is desired to record the travel of a vehicle on a chart, a stylus may be mounted on carriage 9 which will cooperate with a chart 8 placed on the drum 3 to scribe a line which will indicate the course of travel of the vehicle. If the device is to be used as a course follower, a photo sensitive device 11 may be mounted on the carriage 9 and the chart 8 may have a course defined thereon as the border of a non-reflecting black surface, the photo sensitive device 11 being positioned with relation thereto. The operation of the photo sensitive device is as follows:

The gas filled lamp 76 enclosed in a casing 77 is energized from an alternating voltage at a rate of, for instance, 400 cycles per second and its light is directed through opening 78 in the casing 77. The light is directed toward the chart 8 and is reflected therefrom through apertures 74 and 75 in tube 73 to the photo-sensitive tube 68. The output of the phototube will be a maximum when the light is directed to a completely reflecting surface and will be a minimum when the light is directed to a non-reflecting surface and will vary from maximum to minimum as the non-reflecting surface crosses in front of the aperture. When the output of the tube is approximately half of the maximum output possible, the carriage will be aligned with the exact desired position and the vehicle upon which the automatic celestial navigator is mounted will be located as is prescribed on the chart mounted on the drum 43. The output of the photo sensitive tube may be combined with a reference signal which will be of the same frequency and half the amplitude of the maximum signal with opposite polarity so that an "on course" signal from the phototube when combined with the reference signal will produce a "no signal" output. Any other position of the carriage and phototube will develop a signal which will vary from one-half of maximum in one direction through zero to one-half of maximum in the other direction when the carriage is positioned over a non-reflecting surface, and this signal may be employed to indicate to an operator the alignment of the carriage with respect to the chart or may be employed as an energizing voltage for an automatic pilot for controlling the vehicle. The feeding of this energizing voltage into an automatic pilot is conventional and has been represented by block diagram in Figure 22.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An automatic course recorder comprising an automatic navigation device for deriving indications of longitude and latitude, a chart mounted on a cylindrical drum and movable in one direction, a movable stylus, means for moving said chart in accordance with one of said indications, means for moving the stylus in accordance with the other of said indications, and means including a rate motor in each of said moving means operable in accordance with respective changes in longitude and latitude for sustaining movement of the chart and stylus upon the temporary removal of said indications of longitude and latitude.

2. A navigating instrument for craft comprising an automatic light seeking device for maintaining a celestial fix, means for deriving indications of longitude and latitude from said celestial fix, means moving in accordance with said indications of longitude and latitude comprising a cylindrical chart rotatable about its longitudinal axis and a carriage movable with respect to said chart for indicating graphically the position of said craft on said chart, said chart being rotatable with changes of position of said craft in latitude and said carriage being movable with changes of position of said craft in longitude, and means including a rate motor in said movable means operable in accordance with respective changes in longitude and latitude for sustaining the operation of the chart and carriage upon temporary removal of said indications of longitude and latitude.

3. A navigating instrument for craft comprising an angularly movable electronic light seeking device, a universal support therefor, means governed by the device for moving it angularly in an east-west direction and to maintain a celestial fix, a chronometer driven member independent of said device and support which is rotatable in angular synchronism with the earth, and a differential mechanism controlled by a variation between the angular east-west movement of said device and the angular movement of said member which responds to a change in longitude of the craft, a chart having a course plotted thereon, a course follower movable over the chart, means governed by said differential mechanism for moving the course follower in response to variations in longitude of the craft, and means including a rate motor in said course follower moving means operable in accordance with respective changes in the longitude on an extrapolated rate of change basis upon temporary obscuration of the celestial fix.

4. A navigating instrument for craft comprising: an automatic light seeking device for maintaining a celestial fix; means providing an indication of sidereal time; means for combining said indication with the position of said celestial fix to derive an indication of longitude; means for deriving from said celestial fix an indication of latitude; and means movable in accordance with said indications of longitude for indicating graphically the longitude of said craft including a rotary transformer having an output winding, a rate motor energized from a source of voltage, a second motor energized from said output winding, differential means for combining the rotation of said two motors, means for adjusting the position of said output winding by the rotation of said differential combining means, and means for adjusting the energization of said rate motor by rotation of said second motor; whereby said longitude graphical indicating means is positioned by rotation of said differential means on an extrapolated rate of change basis upon temporary obscuration of the celestial fix.

5. A navigating instrument for craft comprising: an automatic light seeking device for maintaining a celestial fix; means providing an indication of sidereal time; means for combining said indication with the position of said celestial fix to derive an indication of longitude; means for deriving from said celestial fix an indication of latitude; and means movable in accordance with said indications of longitude and latitude for indicating graphically the position of said craft including a rotary transformer having an output winding, a rate motor energized from a source of voltage, a second motor energized from said output winding, differential means for combining the rotation of said two motors, means for adjusting the position of said output winding by the rotation of said differential combining means, and means for adjusting the energization of said rate motor by rotation of said second motor; whereby said graphically indicating means is positioned by rotation of said differential means on an extrapolated rate of change basis upon temporary obscuration of the celestial fix.

References Cited in the file of this patent

UNITED STATES PATENTS

| | | |
|---|---|---|
| 2,354,917 | Jones | Aug. 1, 1944 |
| 2,403,152 | Roters | July 2, 1946 |
| 2,424,118 | Rast | July 15, 1947 |
| 2,444,708 | Mosner et al. | July 6, 1948 |
| 2,444,933 | Jasperson | July 13, 1948 |
| 2,492,148 | Herbold | Dec. 27, 1949 |
| 2,532,402 | Herbold | Dec. 5, 1950 |
| 2,598,096 | Bailly | May 27, 1952 |
| 2,769,977 | Roberts et al. | Nov. 6, 1956 |